No. 787,401. PATENTED APR. 18, 1905.
E. P. ROSS.
MANURE SPREADER.
APPLICATION FILED MAR. 17, 1904.
4 SHEETS—SHEET 1.
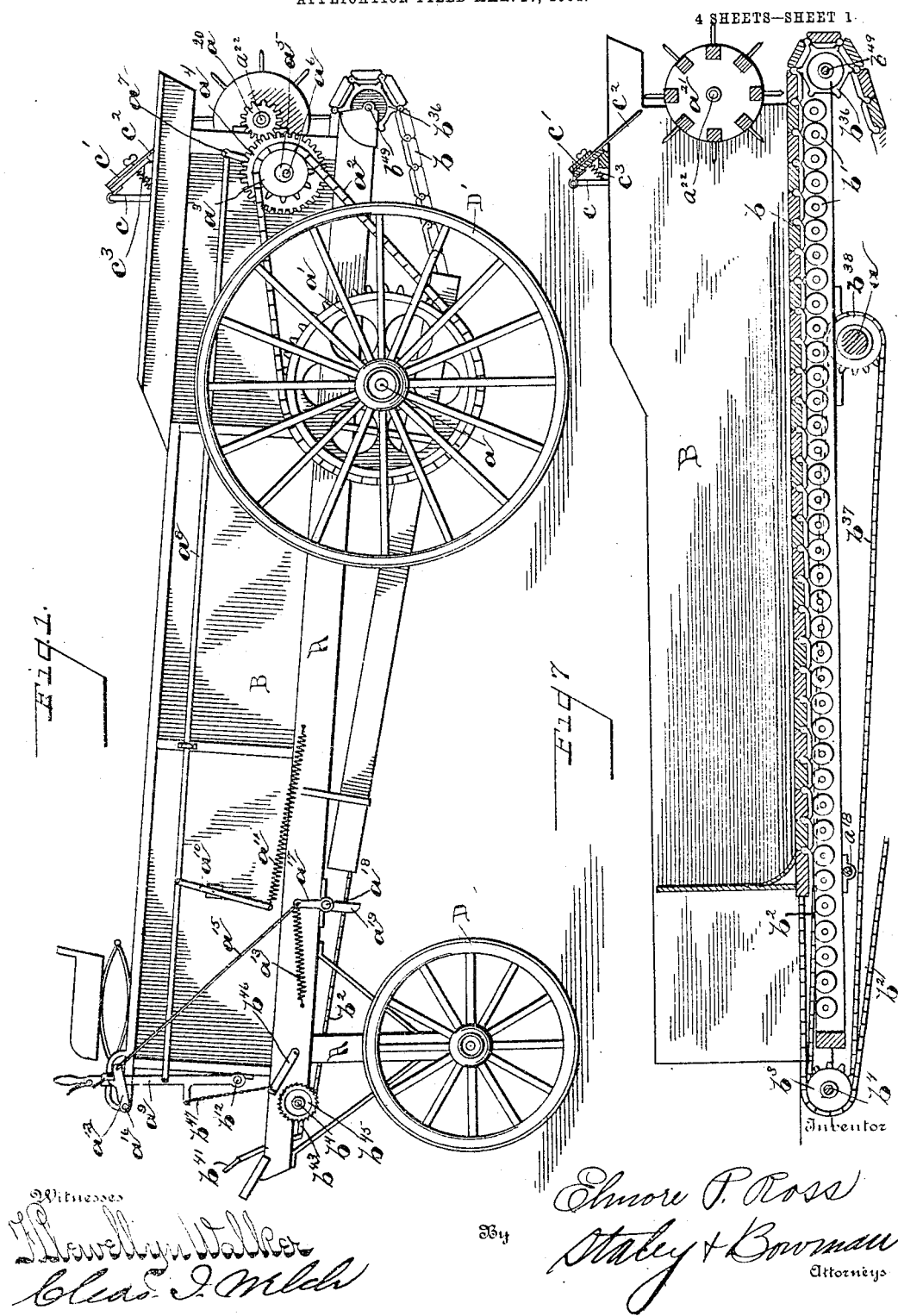

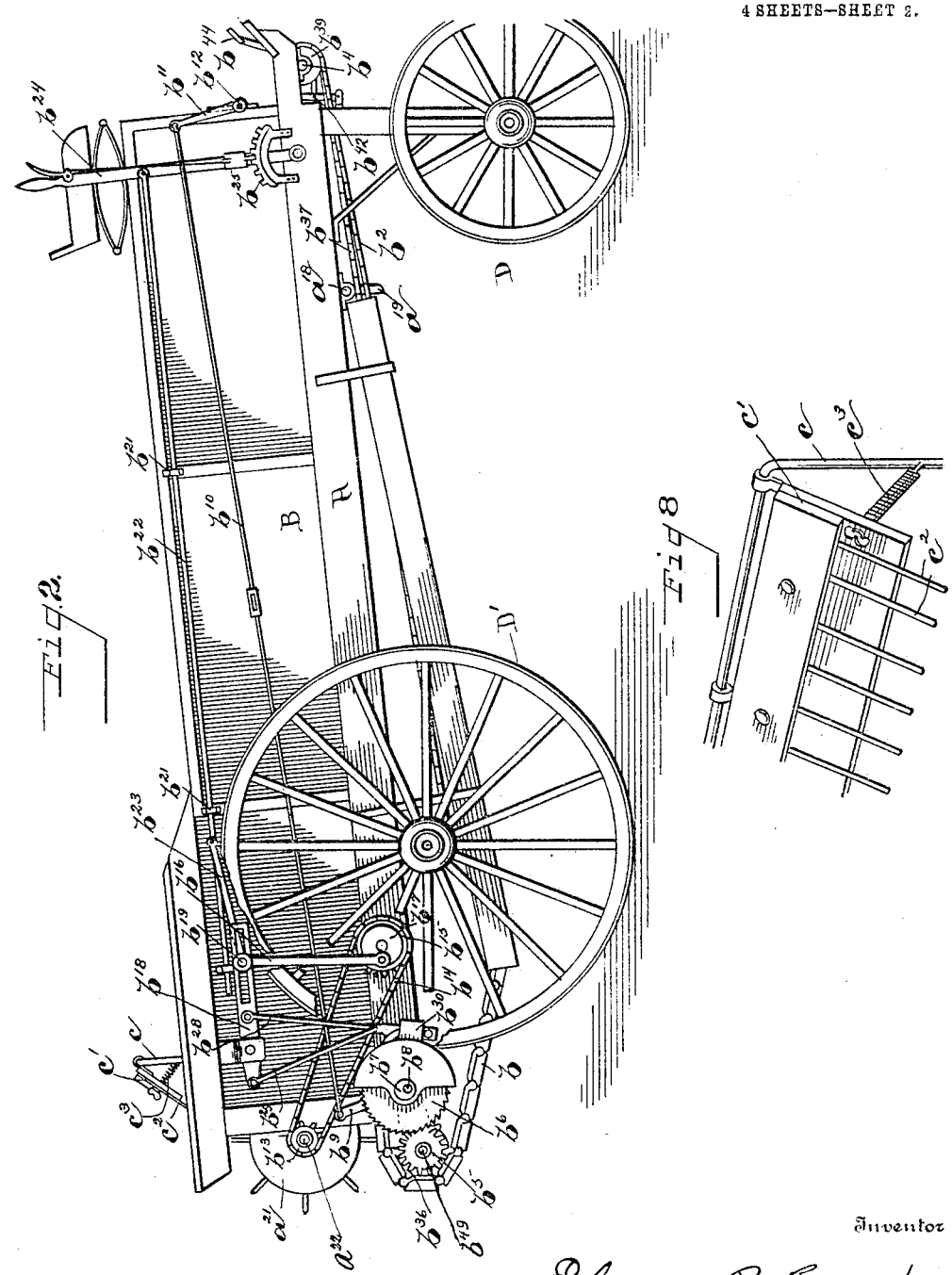

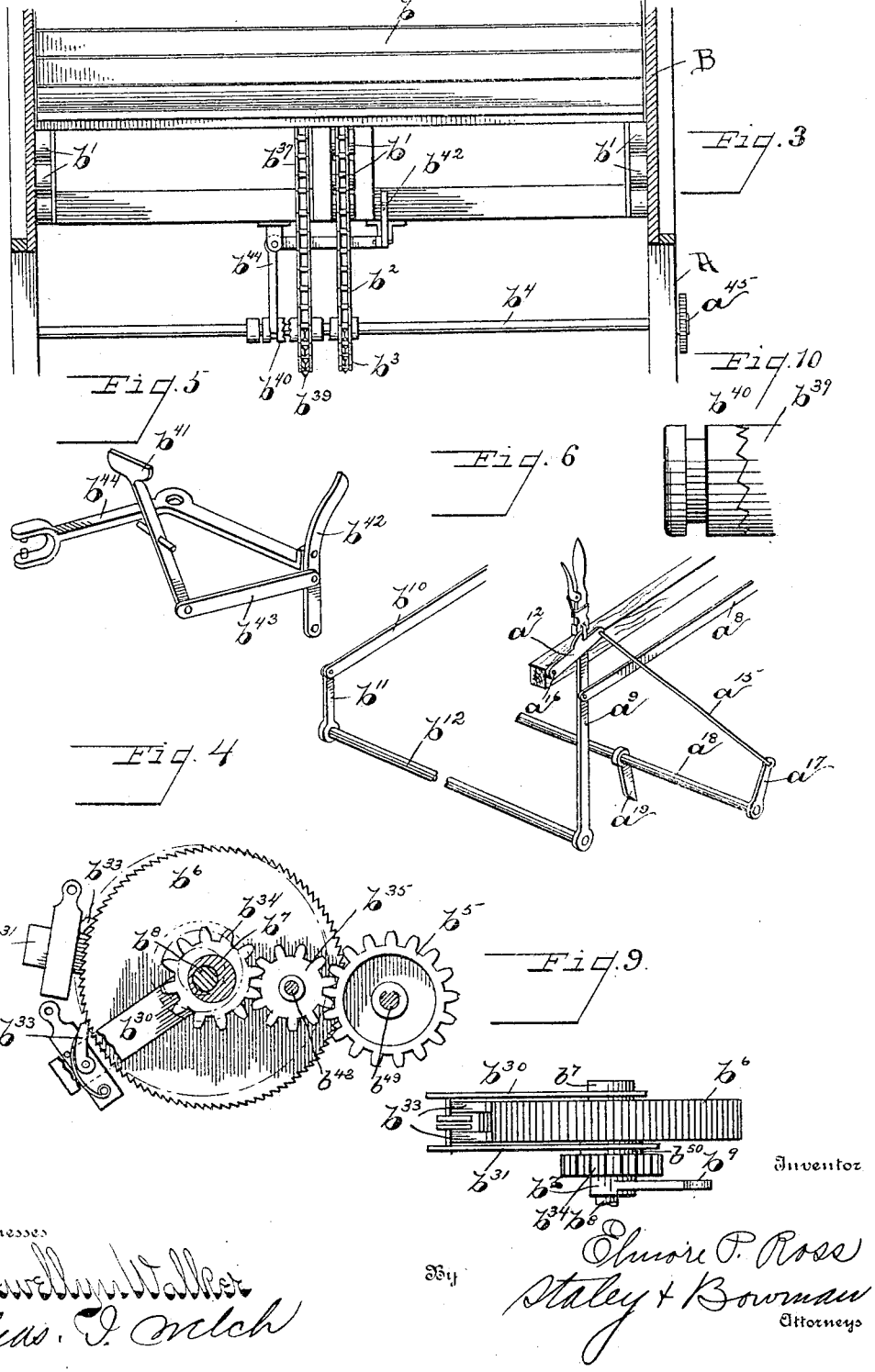

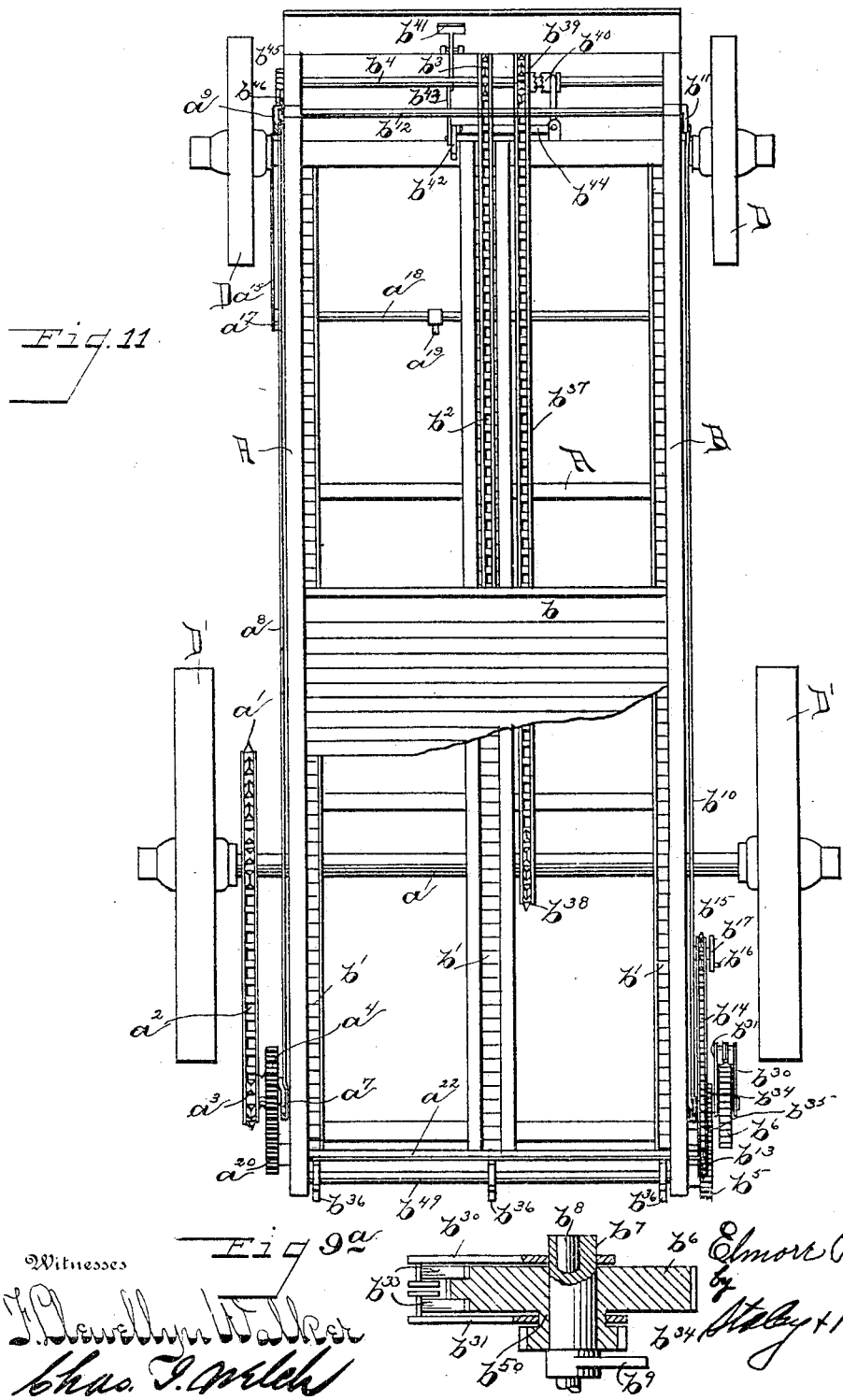

No. 787,401.

Patented April 18, 1905.

UNITED STATES PATENT OFFICE.

ELMORE P. ROSS, OF SPRINGFIELD, OHIO, ASSIGNOR TO THE E. W. ROSS COMPANY, OF SPRINGFIELD, OHIO, A CORPORATION OF OHIO.

MANURE-SPREADER.

SPECIFICATION forming part of Letters Patent No. 787,401, dated April 18, 1905.

Application filed March 17, 1904. Serial No. 198,543.

*To all whom it may concern:*

Be it known that I, ELMORE P. ROSS, a citizen of the United States, residing at Springfield, in the county of Clark and State of Ohio, have invented certain new and useful Improvements in Manure-Spreaders, of which the following is a specification.

My invention relates to manure-spreaders, and is of the type employing a hopper or bed with fertilizer attachments built thereon. It can be applied to the ordinary wagon bed and frame.

My object is to construct a manure-spreader which is simple in all its arrangements and accurate in its movements.

The feeding device for feeding the manure is driven in one direction by mechanism connected with the rear driving-axle, which I shall term the "main" driving mechanism, and is returned to its normal position by a separate mechanism, which I shall term the "returning" mechanism, also connected with said rear driving-axle. Before the returning mechanism begins to operate for returning the feeding devices the driving mechanism is automatically disconnected in a simple and positive manner from the feeding device, and when the feeding device has been returned to normal position the returning mechanism is automatically disconnected in an effective and simple way.

In the drawings, Figure 1 is a side elevation view of my machine, taken from the left side of same, being the left side of the driver as he sits ready to operate same. Fig. 2 is a side elevation view taken from the right-hand side of the device. Fig. 3 is a plan view of a part of the mechanism, showing the web in part only. Fig. 4 is a detail view of part of the driving mechanism for the feeding device. Fig. 5 is a detail view of the devices for throwing the clutch for the returning mechanism. Fig. 6 is a detail view of parts of the mechanism for connecting and disconnecting the driving mechanism for the feeding device. Fig. 7 is a sectional view through the bed of the spreader, showing the web or feeding device in section. Figs. 8, 9, 9ª, and 10 are detail views of parts. Fig. 11 is a top plan view of the machine.

Like parts are represented by similar reference characters throughout the several views.

In my machine I employ a frame A A for supporting the feeding device, and the wagon-bed B is supported on this frame. The front wheels of the machine are lettered D and the rear wheels D'. The rear axle, which is the driving-axle, is indicated by $a$ and is supported by the frame of the machine in any usual way. (See Fig. 1.)

The general construction is such that the feeding device or "web," as it is commonly called, is adapted to move on the bottom of the bed or hopper B and is driven in a direction away from the driver's seat by the main driving mechanism for the purpose of feeding the manure to the beater at the rear of the bed. After the contents of the wagon have all been removed the web has reached its extreme rearward position away from the seat of the operator. It is then returned by the returning mechanism toward the seat of the operator, and during this movement the machine may be returning to its loading-place. There is the advantage of returning the web quickly and positively.

$a'$ indicates a sprocket-wheel rigid with a sleeve formed on the driving axle $a$. An ordinary sprocket-chain $a^2$ connects said last-mentioned wheel with a sprocket-wheel $a^3$, formed integrally with a gear $a^4$, said sprocket and gear being mounted loosely on a sleeve $a^5$. Said sleeve is journaled loosely on a stud or short shaft $a^6$, and said sleeve $a^5$ is formed eccentric to said stud or shaft. An arm $a^7$ projects upwardly from said sleeve $a^5$, and a connecting-rod $a^8$, extending to the front of the machine, is supported by braces on the sides of the wagon-bed and is adapted to slide longitudinally therein. Said connecting-rod is pivotally connected at its front end to the operating-lever $a^9$, rigidly connected to the shaft $b^{12}$. A short arm $a^{10}$, fulcrumed on the side of the wagon-bed and pivotally connected to the connecting-rod $a^8$, is connected to a spring $a^{11}$, and this spring normally tends to move said connecting-rod to its extreme forward position. A pivoted pawl $a^{12}$ is connected to a link $a^{17}$ through the connecting-rod $a^{15}$. This link $a^{17}$, Figs. 1 and 6, is rigidly connected with the shaft $a^{18}$, and there is a downwardly-projecting stop $a^{19}$, secured rigidly to said shaft $a^{18}$. When the operating-lever $a^9$ is thrown rearwardly by the operator, the sleeve $a^5$, Fig. 1, is rotated on the stud $a^6$ until the gear $a^4$ is thrown into mesh with its corresponding gear member $a^{20}$, and said gears $a^4$ and $a^{20}$ are held in mesh by the pawl $a^{12}$. This pawl $a^{12}$ is held in operative position for engaging and holding the operating-lever $a^9$ by the spring $a^{13}$. When the gears $a^4$ and $a^{20}$ are in mesh, there is a direct gear connection from the driving-axle $a$ through the sprockets $a'$ and $a^3$ to the rotary beater, which is indicated by the letter $a^{21}$, Fig. 7, on the shaft $a^{22}$. It is obvious that if the stop-arm $a^{19}$ is operated the pawl $a^{12}$ will be thrown out of engagement with the operating-lever $a^{19}$ against the tension of the spring $a^{13}$, and the spring $a^{11}$, connected with the connecting-rod $a^8$, will at once cause the connecting-rod to slide forward, and thereby partially rotate the sleeve $a^5$ on the stud $a^6$, and thereby throw the gears $a^4$ and $a^{20}$ out of mesh.

The rotary beater operates in connection with the web $b$, Figs. 1 and 7, to scatter the contents of the wagon-bed from the rear of said wagon-bed to the ground. As shown in Fig. 7, the web $b$ has a headboard which projects upwardly, and when the web has reached the limit of its movement rearwardly from the seat of the operator the headboard is in close proximity to the beater.

$b'$ indicates rollers formed in the bottom of the bed, upon which the web is supported and facilitates the movement of the web.

$b^2$ indicates a sprocket-chain connecting the two ends of the web together, and said sprocket-chain and web constitute an endless band. The sprocket-chain extends around the sprocket-wheel $b^3$, (see Fig. 7,) which sprocket-wheel is connected rigid with the shaft $b^4$, which extends entirely across the machine. (See Fig. 3.) The gear-wheel $b^5$ operates a sprocket-wheel $b^{36}$, which is in mesh with the web $b$, as shown in Fig. 2. This gear-wheel $b^5$ operates through a connection with a ratchet-wheel $b^6$, which is journaled loosely on a sleeve $b^7$, which sleeve is formed eccentric to the stud $b^8$, and said sleeve is adapted to rotate on said stud. The sleeve $b^7$ has a projecting-arm $b^9$, to which there is pivoted a connecting-rod $b^{10}$, which extends forwardly, and at its forward end is pivoted a crank $b^{11}$, which is rigid with the shaft $b^{12}$, to which shaft the operating-lever $a^9$ is rigidly connected. This shaft rotates in bearings formed in the sides of the machine, so that when the operating-lever $a^9$ is moved rearwardly or forwardly the shaft $b^{12}$ makes a partial rotation, and thereby motion is transmitted, through the connecting-rod $b^{10}$, to the sleeve $b^7$, and when the operating-lever $a^9$ is moved rearwardly until engaged by the pawl $a^{12}$ both sleeves $a^5$ and $b^7$ are rotated until the gears $a^4$ and $a^{20}$, as explained above, are thrown into mesh and the gears, hereinafter specified as connected with said sleeve $b^7$, are also thrown into mesh. There is in this respect a simultaneous connection of the driving mechanism for the beater and the driving mechanism for the web $b$.

$b^{13}$ is a sprocket-wheel formed rigid with the end of the rotary beater $a^{21}$ and moves in unison therewith. A sprocket-chain $b^{14}$ connects said beater $a^{21}$ with a sprocket-wheel $b^{15}$. A crank $b^{16}$ extends from the disk $b^{17}$, formed on the side of the sprocket-wheel $b^{15}$, and said crank extends upwardly, with a pin formed at its upper end engaging within the slotted opening formed in one end of a walking-beam $b^{18}$. This beam at its rear end (being the end farthest from the seat of the driver) is pivoted to the side of the wagon-bed and is adapted to be oscillated by the movement of the crank $b^{16}$. By adjusting the position of the crank-pin $b^{19}$ within the slotted opening $b^{20}$ I am enabled to vary the extent of oscillation of the plate $b^{18}$ so that it will be given a greater or less oscillation, depending on the distance of the pin $b^{19}$ from the fulcrum-point of said beam. This pin is adjusted by a connecting-rod $b^{22}$, which slides through brackets $b^{21}$, formed on the side of the wagon-bed, and the arm $b^{23}$, pivoted thereto, is pivotally connected with said pin $b^{19}$. The connecting-rod $b^{22}$ extends to the adjusting-lever $b^{24}$, Fig. 2. A notched segment $b^{25}$ is shown in Fig. 2, whereby in connection with the holding-pawl in the usual manner the adjusting-lever $b^{24}$ is held in its adjusted position, and thereby said pin $b^{19}$ is locked in its adjusted position. On each side of the fulcrum-point for said beam $b^{18}$, Fig. 2, there are pivoted downwardly-extending arms $b^{28}$ and $b^{29}$, which connect with pawl-levers $b^{30}$ and $b^{31}$, Fig. 4. These pawl-levers have spring-pressed pawls $b^{33}$. It will thus be seen that when the pivoted beam $b^{18}$ is oscillated through its connection with the pin $b^{19}$ the pawl-levers $b^{30}$ and $b^{31}$ will operate alternately in an up-and-down movement, and when the spring-pressed pawl causes the ratchet $b^6$ to rotate the other pawl-lever will be moving back to its normal position. In this way I produce a continuous step-by-step movement through the rear driving-axle to the gear $b^5$.

The ratchet-wheel $b^6$ is formed rigid with the gear-wheel $b^{34}$, which is in mesh with an intermediate pinion $b^{35}$ on the stud $b^{48}$, which intermediate pinion gears with the wheel $b^5$, Fig. 4, which is formed integral with the sprocket-wheel $b^{36}$ on the shaft $b^{49}$, and thereby motion is transmitted from the sprocket-wheel $b^{36}$ to the web $b$. There is a sleeve $b^{50}$ extending from the ratchet-wheel to the gear $b^{34}$, (see Fig. 9,) formed integral with said ratchet-wheel and gear, so as to connect the two together, and the pawl-levers $b^{30}$ and $b^{31}$ are journaled loosely, respectively, upon the sleeves $b^{7}$ and $b^{50}$.

The returning mechanism for the web or feeding device is shown in part in Fig. 3. It consists of the following parts: A sprocket-chain $b^{37}$ extends from the sprocket-wheel $b^{38}$, Fig. 7, formed rigidly on the driving-axle $a$ near the rear of the machine, to a sprocket-wheel $b^{39}$, journaled loosely on the shaft $b^{4}$. A clutch $b^{40}$ is splined on said shaft $b^{4}$ and is adapted to be thrown into mesh with said sprocket-wheel $b^{39}$. The clutch-teeth are beveled, as shown in Fig. 10. The sprocket-wheel $b^{3}$ is rigidly connected to said shaft $b^{4}$, and the chain $b^{2}$, heretofore referred to, connects the ends of the web together and forms with said web an endless band extending over the sprocket-wheel $b^{3}$, so that when the sprocket-wheel $b^{3}$ rotates with the shaft $b^{4}$ the web is moved to and fro. This shaft $b^{4}$ is rotated by the rear driving-axle whenever the clutch $b^{40}$ is thrown into engagement with said sprocket-wheel $b^{39}$. I have shown a foot-crank $b^{41}$, Fig. 5, which is pivoted to the frame of the machine and extends upwardly in front of the feet of the operator as he sits on the driver's seat. This foot-crank is pivoted to an arm $b^{42}$ by a connecting-rod $b^{43}$, which arm is also pivoted to the frame and extends upwardly into the path of movement of the web, as shown in Fig. 2. This arm $b^{42}$ is connected to a clutch-arm $b^{44}$, the free end of which engages with said clutch $b^{40}$. Whenever the foot-lever $b^{41}$ is depressed, it throws the clutch $b^{40}$ into mesh with the sprocket-wheel $b^{39}$. When the web is to be returned by the returning mechanism to its normal position, the operator with his foot presses the crank-lever $b^{41}$, which throws the clutch mechanism, and in that way connection is made to the driving-axle $a$, which rotates the sprocket-wheel $b^{3}$, which through the chain $b^{2}$ returns the web toward the operator's seat. When the front end of the web reaches a point below the driver's seat, it comes in contact with the projecting stop-arm $b^{42}$ and moves said arm about its pivot, which results in throwing the clutch out of operative position, as will be seen by an examination of Figs. 3 and 5. The beveled clutch-teeth will insure disconnection of the clutch under an excessive strain.

I have also shown mechanism for assisting the rotary beater $a^{21}$ in scattering the manure as it is fed to the rear of the machine. This device I have shown in detail in Fig. 8, and it consists of an inverted -U- shaped frame $c$, which is attached to the sides of the hopper or bed, and pivoted to this is a frame $c'$, which supports knives $c^{2}$, which extend toward the beater and are adapted to bear against the contents of the hopper. I have shown a spring $c^{3}$, yieldingly holding said knives downwardly, adapted to contact with the contents of said hopper; but if any rock or other hard substance is fed to the rear of the hopper the knives will be lifted against the tension of the spring, permitting said substances to move freely through.

In brief, the operation of my machine is as follows: After the hopper or bed has been filled with the contents to be scattered the operator sitting on the driver's seat throws the lever $a^{9}$ rearwardly until it is engaged by the stop-pawl $a^{12}$. This movement results in rotating the sleeve $a^{5}$ and sleeve $b^{7}$ until the gear members are in mesh, and the rotary beater $a^{21}$ is thereby operated by direct connection with the rear driving-axle $a$. The driving mechanism for the web is operated through the sprocket-chain $b^{14}$, making a direct connection between the sprocket-wheel $b^{15}$ and the rotary beater $a^{21}$. The disk $b^{17}$ oscillates the beam $b^{18}$, which operates the pawl-levers $b^{30}$ and $b^{31}$, thereby communicating a step-by-step movement to the disk $b^{6}$, and through the gear $b^{34}$ $b^{35}$ motion is transmitted to the pinion $b^{36}$, which engages with the under side of the web and drives the web rearwardly for the purpose of feeding the contents of the bed or hopper to the rotary beater. The rear end of the web in its forward movement passes underneath the bed or hopper and finally contacts against the stop $a^{19}$, which throws the pawl $a^{12}$ out of engaging position with the lever $a^{9}$, and the spring $a^{11}$ throws a lever forward and by means of the connecting-rod $a^{8}$ throws the gears $a^{4}$ $a^{20}$ out of mesh, thereby disconnecting the rotary beater from the rear driving-axle. This would of itself stop the feeding movement of the web; but in order to insure the returning of the web without endangering any breakage of the parts I find it necessary to throw the gears $b^{34}$ $b^{35}$ out of mesh simultaneously with the disconnecting of the gears $a^{4}$ $a^{20}$. This is done by the connecting-rod $b^{10}$, which, through the connection with the shaft $b^{12}$, oscillates the sleeve $b^{7}$ simultaneously with the oscillation of the sleeve $a^{5}$, and the gears $b^{34}$ $b^{35}$ are thereby thrown out of mesh simultaneously with the disconnecting of the gears $a^{4}$ $a^{20}$. The operator now depresses the foot-crank $b^{41}$, which throws the clutch mechanism into operative position, so that the rear driving-axle transmits motion to the chain $b^{2}$, and thereby returns the web toward the driver's seat. When the web reaches its normal position, the front end of the same contacts against the stop $b^{42}$, and thereby throws the clutch mechanism out of engagement.

In order to hold the web against rearward movement after reaching its normal position and after the clutch $b^{40}$ is thrown out of operative position, which rearward movement might occur when the bed is filled and the machine is being moved from place to place, I use a pivoted pawl $b^{46}$, Fig. 1, which is connected by a chain $b^{47}$ to the operating-lever $a^9$. When the operating-lever is thrown into the position shown in Fig. 1, the pawl is held out of engagement with the pinion-wheel $b^{45}$, which pinion-wheel is journaled rigidly on the shaft $b^4$; but when the operating-lever $a^9$ is in its forward position the pawl $b^{46}$ engages with said pinion-wheel and prevents movement of the shaft $b^4$ in the direction shown by the arrow. When the returning mechanism operates to move the web back to its normal position, the pinion $b^{45}$ rotates in the direction opposite to that shown by the arrow in Fig. 1 and passes the pawl $b^{46}$ freely. When, however, the web has returned to its normal position and the returning mechanism is thrown out of gear, the pawl $b^{46}$ will hold the web against rearward movement until the operating-lever $a^9$ is thrown rearwardly to cause the rear driving-axle to operate the rotary beater and the web in the rearward or feeding direction.

Having thus described my invention, I claim—

1. In a manure-spreader, the combination of an operative shaft, a beater and a conveyer, gears connecting said beater and said shaft, and additional gears connecting said beater and said conveyer, means for raising and lowering one of said gears of each series, a spring adapted to be put under tension when said gears are lowered into connecting position, means for holding said spring against operation until the conveyer releases it, for the purpose of raising said gears out of connecting position, for the purpose specified.

2. In a manure-spreader, the combination of a main operating-shaft, a beater, connecting mechanism between said beater and said shaft normally out of operative position, a conveyer, a series of gears connecting said conveyer with said beater, one of said gears being formed eccentrically to its center, means for moving said gear eccentrically about its center simultaneously with the throwing of the connecting mechanism between the beater and the operating-shaft into operative position, a spring put under tension during said movement, means for holding said spring against operation and means formed on the conveyer for releasing said spring, for the purpose specified.

3. In a manure-spreader, the combination of a main operating-shaft, a beater, and connecting mechanism between the beater and the shaft, a conveyer, and a series of gears constituting the connecting mechanism between said conveyer and said beater, one of said gears being formed eccentrically to its center, means for moving said gear about its center simultaneously with the throwing of the connecting mechanism between the main shaft and the beater into operative position, pawl-levers for operating said series of gears for transmitting motion from said beater to said conveyer, a spring put under tension when said gears are thrown into mesh, means for holding said spring against movement and means formed on said conveyer for releasing said spring for the purpose of throwing said gears out of mesh, substantially as specified.

In testimony whereof I have hereunto set my hand this 15th day of March, A. D. 1904.

ELMORE P. ROSS.

Witnesses:
   CHAS. I. WELCH,
   CLIFTON P. GRANT.